US008467016B2

(12) United States Patent
Paik et al.

(10) Patent No.: US 8,467,016 B2
(45) Date of Patent: Jun. 18, 2013

(54) LIQUID CRYSTAL DISPLAY PANEL WITH POLARIZATION WIRE GRID AND METHOD FOR FABRICATING THE SAME

(75) Inventors: Sang Yoon Paik, Gyeonggi-do (KR); Sung Lim Nam, Seoul (KR)

(73) Assignee: LG Display Co., Ltd., Seoul (KR)

( * ) Notice: Subject to any disclaimer, the term of this patent is extended or adjusted under 35 U.S.C. 154(b) by 2 days.

(21) Appl. No.: 11/454,972

(22) Filed: Jun. 19, 2006

(65) Prior Publication Data

US 2007/0076143 A1    Apr. 5, 2007

(30) Foreign Application Priority Data

Oct. 4, 2005    (KR) .......................... 10-2005-0092986

(51) Int. Cl.
*G02F 1/1335* (2006.01)
*G02F 1/13* (2006.01)
*G02B 5/30* (2006.01)
*G02B 27/28* (2006.01)

(52) U.S. Cl.
USPC .................... 349/96; 349/187; 359/485.05

(58) Field of Classification Search
USPC ......... 349/96, 97–103, 187, 201; 359/485.05, 359/487.03
See application file for complete search history.

(56) References Cited

U.S. PATENT DOCUMENTS

| 4,370,194 A | 1/1983 | Shaver et al. | |
| 5,177,635 A * | 1/1993 | Keilmann | 359/352 |
| 6,219,015 B1 * | 4/2001 | Bloom et al. | 345/87 |
| 6,243,199 B1 * | 6/2001 | Hansen et al. | 359/486 |
| 6,862,054 B2 * | 3/2005 | Kawakami | 349/65 |
| 6,954,245 B2 * | 10/2005 | Mi et al. | 349/119 |
| 7,561,332 B2 * | 7/2009 | Little et al. | 359/486 |
| 2003/0072079 A1 * | 4/2003 | Silverstein et al. | 359/486 |
| 2003/0193635 A1 | 10/2003 | Mi et al. | 349/117 |
| 2004/0183988 A1 | 9/2004 | Austin et al. | |

FOREIGN PATENT DOCUMENTS

| JP | 60-66203 | | 4/1985 |
| JP | H04-365009 | | 12/1992 |
| JP | 05088153 A | * | 4/1993 |
| JP | 09-160013 | | 6/1997 |
| JP | 09-265071 | | 10/1997 |
| JP | 2000-347173 | | 12/2000 |
| JP | 2001-005021 | | 1/2001 |
| JP | 2004-37480 | | 2/2004 |
| JP | 2004-177904 | | 6/2004 |
| JP | 2005-024924 | | 1/2005 |
| JP | 2005-513547 | | 5/2005 |
| JP | 2005-195824 | | 7/2005 |
| JP | 2005-242080 | | 9/2005 |
| JP | 2006-251056 | | 9/2006 |
| JP | 2007-017501 | | 1/2007 |
| WO | WO 01/55778 | | 8/2001 |

* cited by examiner

*Primary Examiner* — Lucy Chien
*Assistant Examiner* — Paisley L Arendt
(74) *Attorney, Agent, or Firm* — Morgan, Lewis & Bockius LLP (57) ABSTRACT

A liquid crystal display panel includes first and second substrates bonded to each other, a liquid crystal layer interposed therebetween, a plurality of first polarization wire grids formed on the first substrate, and a plurality of second polarization wire grids formed on the second substrate.

9 Claims, 5 Drawing Sheets

LIQUID CRYSTAL DISPLAY PANEL WITH POLARIZATION WIRE GRID AND METHOD FOR FABRICATING THE SAME

This application claims the benefit of Korean Patent Application No. P2005-0092986, filed in Korea on Oct. 4, 2005, which is hereby incorporated by reference.

BACKGROUND OF THE INVENTION

1. Field of the Invention

The present invention relates to a liquid crystal display (LCD) panel, and more particularly, to an LCD panel, the thickness of which can be reduced, and a method for fabricating the same.

2. Discussion of the Related Art

Recently, various flat panel display devices have been widely utilized to replace cathode ray tubes because of their light weight and small volume. Examples of the flat panel displays usually include LCDs, field emission displays, plasma display panels, and light emitting displays.

The LCD utilizes an electric field to adjust light transmittance of liquid crystal, thereby displaying an image. The LCD typically includes an LCD panel having liquid crystal cells arranged in a matrix shape, and a driving circuit for driving the LCD panel. The LCD panel is provided with pixel electrodes and a common electrode, which apply electric fields to the liquid crystal cells, respectively.

In general, the pixel electrodes are formed on a lower substrate of the LCD panel and correspond to the respective liquid crystal cells, and the common electrode is formed on the entire surface of an upper substrate of the LCD panel. The pixel electrodes are electrically connected to thin film transistors (TFTs) serving as switching elements. The TFTs supply data signals, by which the pixel electrodes together with the common electrode drive the liquid crystal cells.

Figure 1:
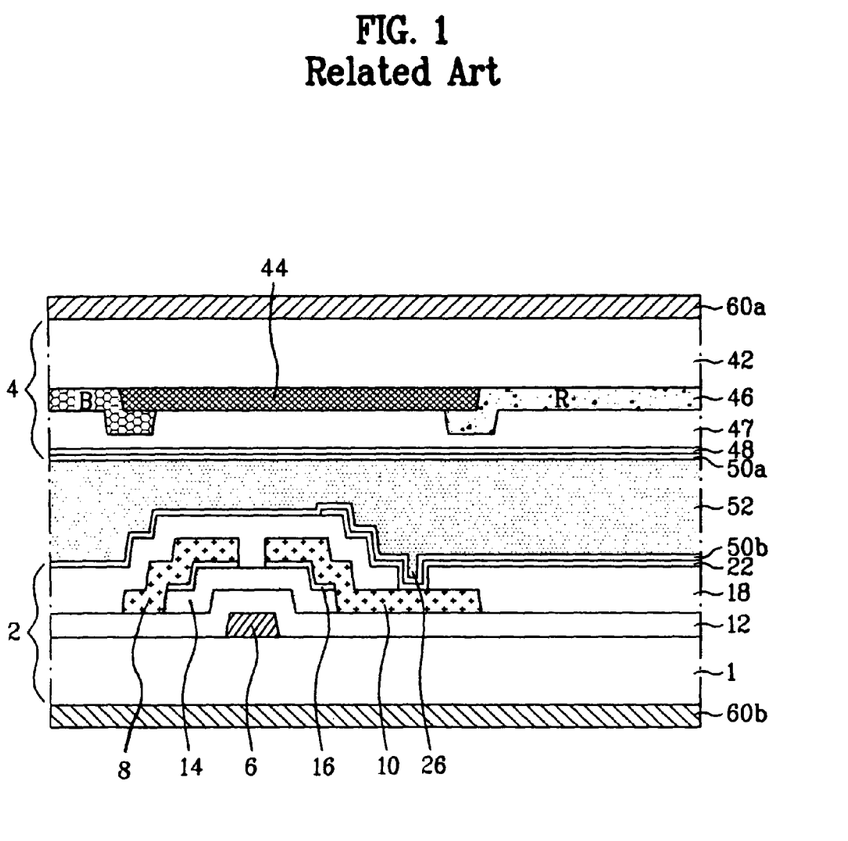
FIG. 1 is a sectional view schematically illustrating a liquid crystal display (LCD) panel according to the related art.

FIG. 1 is a sectional view schematically illustrating an LCD panel according to the related art. As shown in FIG. 1, the related art LCD panel includes a color filter array substrate 4, a TFT array substrate 2, an upper polarization plate 160a attached to a front surface of the color filter array substrate 4, and a lower polarization plate 60b attached to a rear surface of the TFT array substrate 2. The color filter array substrate 4 is formed by sequentially depositing an upper substrate 42, a black matrix layer 44, a color filter layer 46, an overcoat layer 47, a common electrode 48, and an upper orientation film 50a. The TFT array substrate 2 further includes a lower substrate 1, TFTs, pixel electrodes 22 and a lower orientation film 50b formed on the lower substrate 1, liquid crystal 52 injected into a space between the color filter array substrate 4 and the TFT array substrate 2.

Each of the TFTs includes a gate electrode 6 connected to a gate line (not shown), a source electrode 8 connected to a data line (not shown), and a drain electrode 10 connected to corresponding one of the pixel electrodes 22 through a drain contact hole 26. Moreover, each of the TFTs further includes semiconductor layers 14 and 16 for forming a communication channel between the source electrode 8 and the drain electrode 10 by a gate voltage supplied to the gate electrode 6. The TFTs supply data signals from the data lines to the pixel electrodes 22 in response to gate signals from the gate lines.

The pixel electrodes 22 are located at pixel regions and are formed of a transparent conductive material with a high light transmittance. The pixel regions are divided from each other by the data lines and the gate lines interposing a gate insulating layer 12 therebetween. The pixel electrodes 22 are formed on a passivation film 18 formed on the front surface of the lower substrate 1, and are electrically connected to the drain electrodes 10 through the drain contact holes 26 formed through the passivation film 18. Moreover, the pixel electrodes 22 and the common electrode 48 generate a difference of electric potentials according to the data signals supplied from the TFTs. Due to the difference of electric potentials, the liquid crystal 52 located between the lower substrate 1 and the upper substrate 42 is rotated by isotropy of dielectric constants. The amount of light transmitted from a light source to the upper substrate 42 via the pixel electrodes 22 is adjusted by the rotated liquid crystal 52.

The black matrix layer 44 on the color filter array substrate 4 overlaps with TFT regions and the gate and data lines (not shown) of the lower substrate 1, and divides the pixel regions. The black matrix layer 44 serves to prevent light from leaking and to absorb external light, thereby increasing contrast. The color filter layer 46 is formed on the pixel regions, which are divided by the black matrix layer 44. The color filter layer 46 is differently formed according to Red (R), Green (G), and Blue (B) colors, thereby forming R, G, and B colors. The overcoat layer 47 is formed by applying a transparent resin having an insulating property on the upper substrate 42 including the color filter layer 46. The overcoat layer 47 serves to electrically insulate the black matrix layer 44, to which a designated voltage is applied, and the common electrode 48, to which a common voltage is applied, from each other.

In a TN mode LCD, the overcoat layer 47 is not utilized. In the event that the common voltage, serving as a reference when the liquid crystal 52 is driven, is applied to the common electrode 48, the common electrode 48 generates a difference of electric potentials with the pixel electrodes 22 formed on the lower substrate 1. In an IPS mode LCD, the common electrode is formed on the lower substrate 1.

The upper and lower orientation films 50a and 50b serve to orient the liquid crystal 52, and are respectively formed on the color filter array substrate 4 and the TFT array substrate 2 by applying an orienting material such as polyimide (PI), and performing a rubbing process. The lower polarization plate 60b is attached to the rear surface of the lower substrate 1 to polarize rays incident from a back light unit (not shown). The upper polarization plate 60a is attached to the front surface of the upper substrate 42 to polarize rays emitted from the LCD panel.

Each of the upper and lower polarization plates 60a and 60b is formed such that first and second passivation layers are stacked under the condition that a polarizer (not shown) is formed between the first and second passivation layers. Here, the polarizer is formed by stretching a Poly Vinyl Alcohol film and soaking the film in an iodine solution and a dye solution having a color differing from that of the iodine so that iodine molecules are arranged in parallel with the stretched direction. The first and second passivation layers are made of triacetate cellulose (TAC), and serve to prevent the stretched polarizer from being constricted and to protect the polarizer. Thus, the upper and lower polarization plates 60a and 60b are respectively attached to the rear and front surfaces of the bonded lower and upper substrates 1 and 42 by a polarization plate attaching process.

However, the related art LCD panel has several problems due to the polarization plate attaching process. First, there are foreign substances introduced into spaces between the LCD panel and the polarization plates 60a and 60b during the polarization plate attaching process, thereby generating defects in the LCD panel. Second, the polarization plates 60a and 60b attached to the LCD panel during the polarization plate attaching process generate scratches in the LCD panel.

Third, the polarization plates 60a and 60b attached to the front and rear surfaces 1 and 42 of the LCD panel for polarizing rays are expensive, thereby increasing the production costs and thickness of the LCD panel.

SUMMARY OF THE INVENTION

Accordingly, the present invention is directed to a liquid crystal display (LCD) panel and a method for fabricating the same that substantially obviate one or more problems due to limitations and disadvantages of the related art.

An object of the present invention is to provide an LCD panel, in which polarization wire grids are formed on surfaces of substrates, and a method for fabricating the same, thereby reducing the thickness of the LCD panel.

Additional advantages, objects, and features of the invention will be set forth in part in the description which follows, and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve this object and other advantages and in accordance with the purpose of the invention, as embodied and broadly described herein, the LCD panel includes first and second substrates bonded to each other, a liquid crystal layer interposed therebetween, a plurality of first polarization wire grids formed on the first substrate, and a plurality of second polarization wire grids formed on the second substrate.

In another aspect of the present invention, the method for fabricating a LCD panel includes forming a plurality of first polarization wire grids on the front surface of a first substrate, on which a color filter array is formed, forming a plurality of second polarization wire grids on the rear surface of a second substrate, on which a TFT array is formed, and forming a liquid crystal layer between the first and second substrates.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiments of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings. Wherever possible, the same reference numbers will be used throughout the drawings to refer to the same or like parts.

Figure 2:
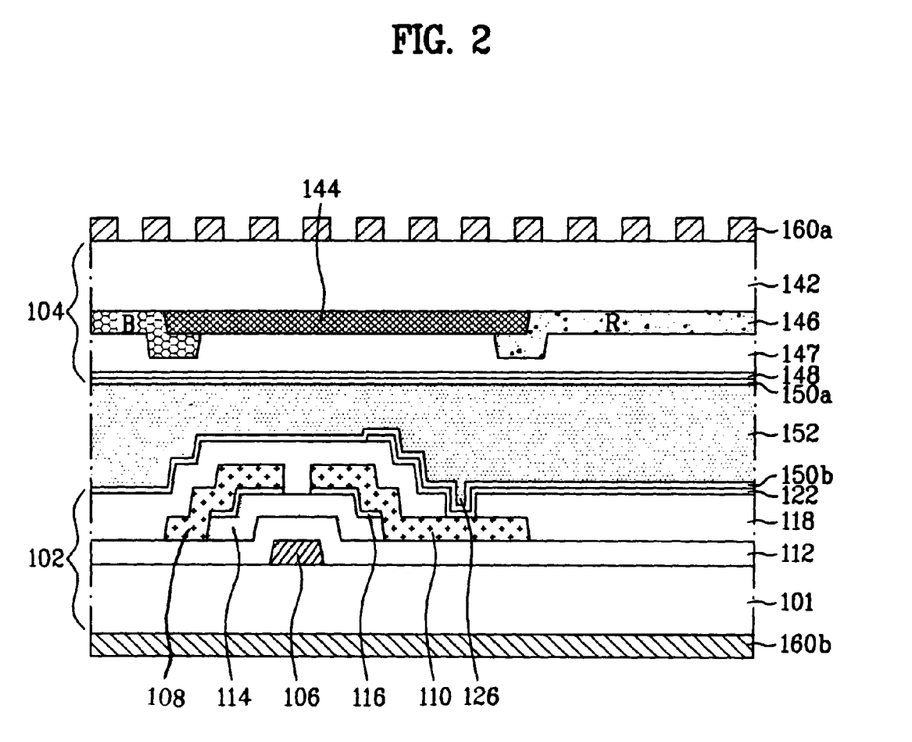
FIG. 2 is a sectional view schematically illustrating an LCD panel in accordance with an exemplary embodiment of the present invention.

FIG. 2 is a sectional view schematically illustrating of a liquid crystal display (LCD) panel in accordance with an exemplary embodiment of the present invention. As shown in FIG. 2, the LCD panel includes a color filter array substrate 104, a thin film transistor (TFT) array substrate 102, a plurality of first polarization wire grids 160a formed on the color filter array substrate 104, and a plurality of second polarization wire grids 160b formed on the TFT array substrate 102.

The TFT array substrate 102 further includes a lower substrate 101, TFTs, pixel electrodes 122, and a lower orientation film 150b formed on the lower substrate 101. Each of the TFTs includes a gate electrode 106 connected to a gate line (not shown), a source electrode 108 connected to a data line (not shown), and a drain electrode 110 connected to a corresponding one of the pixel electrodes 122 through a drain contact hole 126. Each of the TFTs is also provided with semiconductor layers 114 and 116 for forming a communication channel between the source electrode 108 and the drain electrode 110 by a gate voltage supplied to the gate electrode 106. Moreover, the TFTs selectively supply data signals from the data lines to the pixel electrodes 122 in response to gate signals from the gate lines.

The pixel electrodes 122 are located at pixel regions, which are divided by the data lines and the gate lines interposing a gate insulating layer 112 therebetween, and may be made of a transparent conductive material having a high light transmittance. The pixel electrodes 122 are arranged on a passivation film 118 formed on a front surface of the lower substrate 101, and are electrically connected to the drain electrodes 110 through the drain contact holes 126 formed through the passivation film 118. Moreover, the pixel electrodes 122 and a common electrode 148 formed on an upper substrate 142 generate a difference of electric potentials according to the data signals supplied from the TFTs. Due to the difference of electric potentials, liquid crystal 152 located between the lower substrate 110 and the upper substrate 142 is rotated by isotropy of dielectric constants. The amount of light transmitted from a light source (not shown) to the upper substrate 142 via the pixel electrodes 122 is adjusted by the rotated liquid crystal 152.

The color filter array substrate 104 may be formed by sequentially depositing the upper substrate 142, a black matrix layer 144, a color filter layer 146, an overcoat layer 147, the common electrode 148, and an upper orientation film 150a. The black matrix layer 144 of the color filter array substrate 104 overlaps with TFT regions and the gate and data lines (not shown) of the lower substrate 101, and divides the pixel regions, on which the color filter layer 146 is formed. The black matrix layer 144 serves to prevent light from leaking and absorb external light, thereby increasing contrast.

The color filter layer 146 is arranged on the pixel regions. The color filter layer 146 may be differently formed according to Red (R), Green (G), and Blue (B) colors, thereby forming R, G, and B colors. The overcoat layer 147 is formed by applying a transparent resin having an insulating property on the upper substrate 142 including the color filter layer 146. The overcoat layer 147 serves to electrically insulate the black matrix layer 144, to which a designated voltage is applied, and the common electrode 148, to which a common voltage is applied, from each other.

In a TN mode LCD, the overcoat layer 147 is not needed. In the event that the common voltage, serving as a reference when the liquid crystal 152 is driven, is applied to the common electrode 148, the common electrode 148 generates a difference of electric potentials with the pixel electrodes 122 formed on the lower substrate 101. In an IPS mode LCD, the common electrode is formed on the lower substrate 101. The upper and lower orientation films 150a and 150b for orienting the liquid crystal 152 may be respectively formed on the color filter array substrate 104 and the TFT array substrate 102 by applying an orienting material such as polyimide (PI), and performing a rubbing process.

Figure 3:
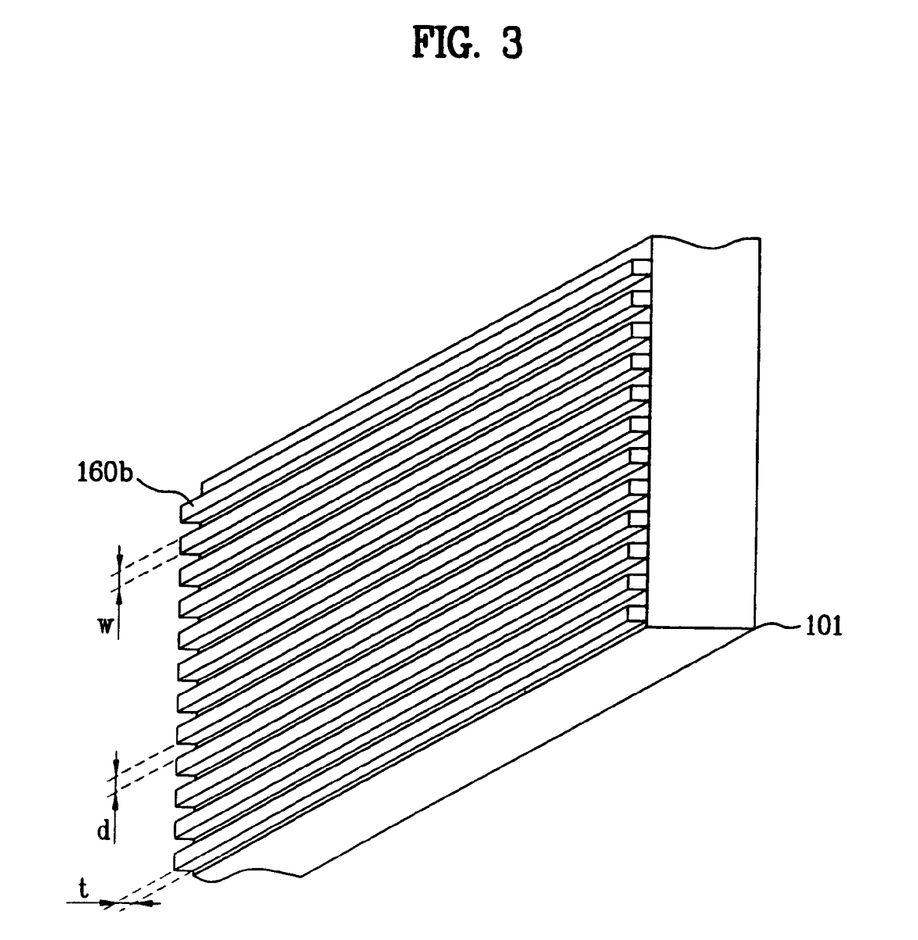
FIG. 3 is a perspective view schematically illustrating a plurality of second polarization wire grids are formed on a lower substrate of the LCD panel of FIG. 2.

FIG. 3 is a perspective view schematically illustrating a plurality of second polarization wire grids 106b are formed on the lower substrate 101 of the LCD panel of FIG. 2. As shown in FIG. 3, the plurality of second polarization wire grids 160b are formed as parallel stripes, which are arranged at regular intervals (d) of several μm in a first direction on the rear surface of the lower substrate 101.

Each of the plurality of second polarization wire grids 160b may have a thickness (t) of several hundred~thousand Å and a width (W) of several μm. The polarizing efficiency and characteristics of the plurality of second polarization wire grids 160b may be changed by varying the intervals (d) between the neighboring second polarization wire grids 160b and the thickness (t) and the width (W) of the second polarization wire grids 160b. The plurality of second polarization wire grids 160b polarize irregularly polarized light incident from a back light unit (not shown) using clearances of the intervals (d) of several μm between the second polarization wire grids 160b, thereby generating linearly polarized light traveling in the first direction. The plurality of second polarization wire grids 160b may be formed on the rear surface of the lower substrate 101 by Hologram Lithography or E-beam Lithography and a Lift-OFF method using a metal, such as copper (Cu) or aluminum (Al).

Figure 4:
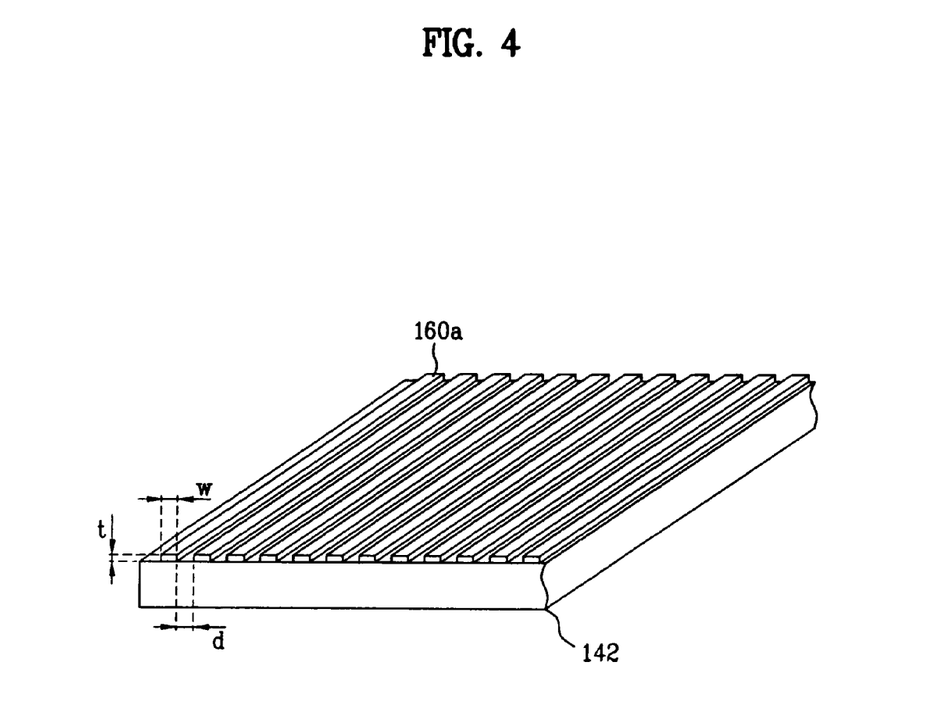
FIG. 4 is a perspective view schematically illustrating a plurality of first polarization wire grids are formed on an upper substrate of the LCD panel of FIG. 2.

FIG. 4 is a perspective view schematically illustrating a plurality of first polarization wire grids 106a formed on an upper substrate of the LCD panel of FIG. 2. As shown in FIG. 4, the plurality of first polarization wire grids 160a are formed as parallel stripes, which are arranged at regular intervals (d) of several μm in a second direction, orthogonal to the first direction, on the front surface of the upper substrate 142.

Each of the plurality of first polarization wire grids 160a has a thickness (t) of several hundred~thousand Å, and a width (W) of several μm. The polarizing efficiency and characteristics of the plurality of first polarization wire grids 160a may be changed by varying the intervals (d) between the neighboring first polarization wire grids 160a and the thickness (t) and the width (W) of the first polarization wire grids 160a. Also, the plurality of first polarization wire grids 160a polarize irregularly polarized light emitted from the LCD panel using clearances of the intervals (d) between the first polarization wire grids 160a, thereby generating linearly polarized light traveling in the second direction. The plurality of first polarization wire grids 160a may be formed on the front surface of the upper substrate 142 by Hologram Lithography or E-beam Lithography and a Lift-Off method using a metal, such as copper (Cu) or aluminum (Al). Moreover, the plurality of first polarization wire grids 160a may be arranged in the first direction the same as the plurality of second polarization wire grids 160b.

As described above, the LCD panel of the exemplary embodiment of the present invention is provided with the polarization wire grids 160a and 160b that are arranged at the regular intervals (d) on the front surface of the upper substrate 142 and the rear surface of the lower substrate 101 to polarize incident light by patterning. According to such an arrangement of the exemplary embodiment, there is no need to add a separate polarization plate, thereby skipping a process for attaching the polarization plate.

Figure 5:
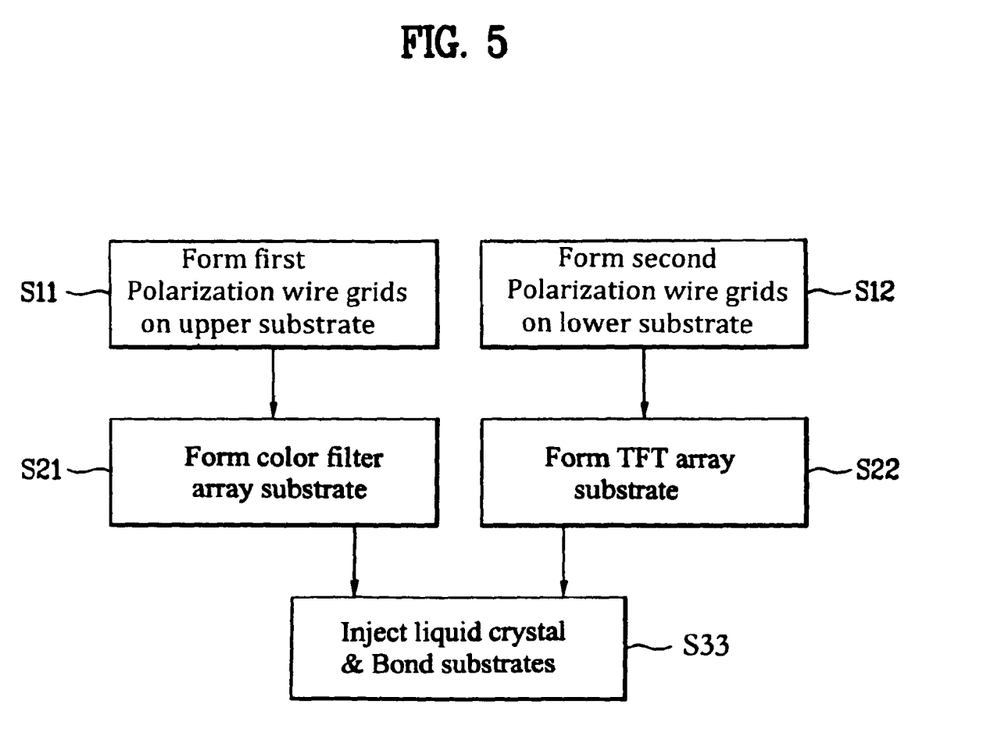
FIG. 5 is a flow chart schematically illustrating a method for fabricating an LCD panel in accordance with an exemplary embodiment of the present invention.

FIG. 5 is a flow chart schematically illustrating a method for fabricating a LCD panel in accordance with an exemplary embodiment of the present invention. Hereinafter, the method for fabricating a LCD panel will be described with reference to FIGS. 2 and 5.

First, as Step S11, the plurality of first polarization wire grids 160a are prepared in a stripe shape, each grid 160a having a thickness (t) of several hundred~thousand Å and a width (W) of several μm, and are thus arranged in parallel at regular intervals (d) of several μm in a first direction on the front surface of the upper substrate 142.

At Step S12, the plurality of second polarization wire grids 160b are prepared in a stripe shape, each grid 160b having a thickness (t) of several hundred~thousand Å and a width (W) of several μm, and are thus arranged in parallel at regular intervals (d) of several μm in a second direction, orthogonal to the first direction, on the rear surface of the lower substrate 101. The plurality of second polarization wire grids 160b may be formed in the first direction the same as the plurality of first polarization wire grids 160a.

Thereafter, at Step S21, the black matrix layer 144, the color filter layer 146, the overcoat layer 147, the common electrode 148, and the upper orientation film 150a are sequentially formed on the rear surface of the upper substrate 142, which has the plurality of first polarization wire grids 160a formed on its front surface, thereby fabricating the color filter array substrate 104.

Further, at Step S22, the TFTs, the pixel electrodes 122 and the lower orientation film 150b are formed on the front surface of the lower substrate 101, which has the plurality of second polarization wire grids 160b formed on its rear surface, thereby fabricating the TFT array substrate (S22).

Finally, at Step S33, a sealant is applied to at least one of the color filter array substrate 102 and the TFT array substrate 104. In the event that a liquid crystal injection method is used, a liquid crystal inlet is formed through the sealant applied to at least one of the color filter array substrate 102 and the TFT array substrate 104. Thus, the two array substrates 102 and 104 are bonded to each other, and liquid crystal is injected into a space between the two array substrates 102 and 104 through the liquid crystal inlet. Then, the two array substrates 102 and 104 are firmly bonded to each other, thereby fabricating the LCD panel.

In the event that a liquid crystal drop method is used, the liquid crystal is dropped on one of the two array substrates 102 and 104 inside the applied sealant. Thus, the substrate, on which the liquid crystal is dropped, is located at the lower part, and the other substrate of the two array substrates 102 and 104 is reversed. Then, the two array substrates 102 and 104 facing each other are bonded to each other, thereby fabricating the LCD panel.

As described above, the method for fabricating the LCD panel according to the exemplary embodiment of the present invention includes forming the polarization wire grids 160a and 160b at the regular intervals (d) on the front surface of the upper substrate 142 and the rear surface of the lower substrate 101 for polarizing incident light by patterning, and therefore no separate polarization plate is needed, thereby omitting a process for attaching the polarization plate.

As described above, the LCD panel and the method for fabricating the same in accordance with the exemplary embodiments of the present invention have several effects. That is, since direct polarization wire grids for polarizing incident light are arranged on the front surface of an upper substrate and the rear surface of a lower substrate at regular intervals (d) of several μm by patterning, a separated polarization plate and a process for attaching the polarization plate are not needed. Thus, the omission of the expensive polarization plate can reduce the thickness of the LCD panel as well as production costs of the LCD panel, and further can prevent the occurrence of defects in the LCD panel caused by foreign substances generated due to the attachment of the polarization plate.

It will be apparent to those skilled in the art that various modifications and variations can be made in the LCD panel and the method of fabricating the same of the present invention without departing from the spirit or scope of the inventions. Thus, it is intended that the present invention covers the modifications and variations of this invention provided they come within the scope of the appended claims and their equivalents.

What is claimed is:

1. A liquid crystal display (LCD) panel comprising:
    a first substrate and a second substrate, including a plurality of sub pixels, bonded to each other;
    a liquid crystal layer interposed between the first and second substrates;
    a common electrode and a pixel electrode formed on an inner surface of the first substrate and the second substrate respectively to drive the liquid crystal layer;
    a plurality of first polarization wire grids formed in a single direction on an entire front surface of the first substrate, opposite to the inner surface including the common electrode; and
    a plurality of second polarization wire grids formed in a single direction on an entire rear surface of the second substrate, opposite to the inner surface including the pixel electrode,
    wherein each of the plurality of first polarization wire grids has a thickness of several hundred-thousand Å, and a width of several μm,
    wherein each of the plurality of second polarization wire grids has a thickness of several hundred-thousand Å, and a width of several μm,
    wherein the plurality of first polarization wire grids and the plurality of second polarization wire grids are made of a metal material, which includes one of copper and aluminum,
    wherein the plurality of first polarization wire grids are arranged in parallel at regular intervals of several μm on a front surface of the first substrate, and the plurality of second polarization wire grids are arranged in parallel at regular intervals of several μm on a rear surface of the second substrate,
    wherein a color filter layer is formed on the inner of the surface of the first substrate to overlap with the plurality of the first polarization wire grids in one-to-many correspondence;
    wherein the first polarization wire grids are formed on the front surface of the first substrate including the color filter layer; and
    wherein the pixel electrode having smaller area than the common electrode overlaps with the plurality of first polarization wire grids in one-to-many correspondence.

2. The LCD according to claim 1, wherein the plurality of first polarization wire grids are formed in a stripe shape and are arranged in a first direction on a front surface of the first substrate, and the plurality of second polarization wire grids are formed in a stripe shape and are arranged in a second direction, orthogonal to the first direction, on a rear surface of the second substrate.

3. The LCD according to claim 1, wherein the plurality of first polarization wire grids are formed in a stripe shape and are arranged in a first direction on a front surface of the first substrate, and the plurality of second polarization wire grids are formed in a stripe shape and are arranged in the first direction on a rear surface of the second substrate.

4. A method for fabricating a liquid crystal display (LCD) panel comprising:
    forming a plurality of first polarization wire grids in a single direction on an entire front surface of a first substrate, on which a color filter array inclusive of a common electrode formed on an inner surface of the first substrate is formed;
    forming a plurality of second polarization wire grids in a single direction on an entire rear surface of a second substrate, on which a thin film transistor (TFT) array inclusive of a pixel electrode formed on an inner surface of the second substrate is formed; and
    wherein each of the plurality of first and second polarization wire grids has a thickness of several hundred-thousand Å, and a width of several μm,
    wherein the plurality of first polarization wire grids and the plurality of second polarization wire grids are made of a metal material, which includes one of copper and aluminum,
    wherein the plurality of first polarization wire grids are arranged in parallel at regular intervals of several μm on a front surface of the first substrate, and the plurality of second polarization wire grids are arranged in parallel at regular intervals of several μm on a rear surface of the second substrate,
    wherein a color filter layer is formed on the inner the surface of the first substrate to overlap with the plurality of the first polarization wire grids in one-to-many correspondence;
    wherein the first polarization wire grids are formed on the front surface of the first substrate including the color filter layer; and
    wherein the pixel electrode having smaller area than the common electrode overlaps with the plurality of first polarization wire grids in one-to-many correspondence.

5. The method according to claim 4, wherein the plurality of first polarization wire grids are formed in a stripe shape and are arranged in a first direction on the front surface of the first substrate, and the plurality of second polarization wire grids are formed in a stripe shape and are arranged in a second direction, orthogonal to the first direction, on the rear surface of the second substrate.

6. The method according to claim 4, wherein the plurality of first polarization wire grids are formed in a stripe shape and are arranged in a first direction on the front surface of the first substrate, and the plurality of second polarization wire grids are formed in a stripe shape and are arranged in the first direction on the rear surface of the second substrate.

7. The method according to claim 4, wherein the liquid crystal layer is formed by applying a sealant including a liquid crystal inlet to at least one of the first and second substrates and injecting liquid crystal into a space between the first and second substrates through the liquid crystal inlet.

8. The method according to claim 4, wherein the liquid crystal layer is formed by applying a sealant to an edge of one of the first and second substrates and dropping liquid crystal inside the sealant.

9. The method according to claim 8, wherein the substrate, on which the liquid crystal is dropped, is arranged as a lower substrate, and the other substrate of the first and second substrates is reversed as an upper substrate, thereby bonding the two substrates to each other.

* * * * *